United States Patent [19]

Safonnikov et al.

[11] 4,438,313
[45] Mar. 20, 1984

[54] ELECTROSLAG WELDING METHOD

[75] Inventors: Anatoly N. Safonnikov; Anatoly V. Antonov, both of Kiev, U.S.S.R.

[73] Assignees: Institut Elektrosvarki Imeni E.O. Patona; Akademii Nauk Ukrainsko, both of U.S.S.R.

[21] Appl. No.: 355,595
[22] PCT Filed: Jun. 30, 1981
[86] PCT No.: PCT/SU80/00116
§ 371 Date: Feb. 18, 1982
§ 102(e) Date: Feb. 18, 1982
[87] PCT Pub. No.: WO82/00110
PCT Pub. Date: Jan. 21, 1982
[51] Int. Cl.³ .............................................. B23K 25/00
[52] U.S. Cl. .................................................. 219/73.1
[58] Field of Search ................... 219/73, 73.1, 73.2, 219/126

[56] References Cited
U.S. PATENT DOCUMENTS
3,885,121  5/1975  Dudko et al. .................. 219/73.1

FOREIGN PATENT DOCUMENTS
218355 of 0000 U.S.S.R. .
512887 of 0000 U.S.S.R. .
152265 4/1962 U.S.S.R. .

OTHER PUBLICATIONS

Safonnikov, A. N., Svarka Metallov Plastinchatymi Elektrodami (Metal Welding by Plate Electrodes). Kiev, "Tekhnika", 1966, pp. 57-58.

Primary Examiner—B. A. Reynolds
Assistant Examiner—Catherine M. Sigda
Attorney, Agent, or Firm—Lilling & Greenspan

[57] ABSTRACT

A method for electroslag welding of metals by a large-section electrode includes establishing a slag bath, fusing the electrode and the edges being weld-joined, filling with molten metal the inlet metal mould and the gap between the edges, and subsequently removing the inlet shrinkhead. The electrode is, in establishing the slag bath and filling with metal the inlet metal mould, fused at a rate lower than the electrode fusion rate in filling with metal the gap between the edges being weld-joined at constant electrical parameters of the electroslag welding. A brittle interlayer is formed between the inlet shrinkhead and the weld in the course of welding, and the weld is made so that it has a low electrical resistance.

6 Claims, 6 Drawing Figures

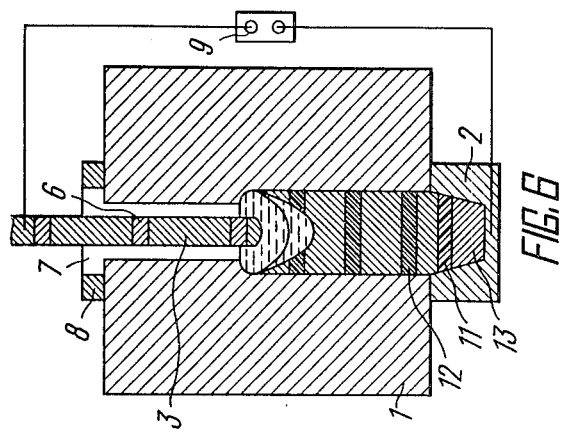
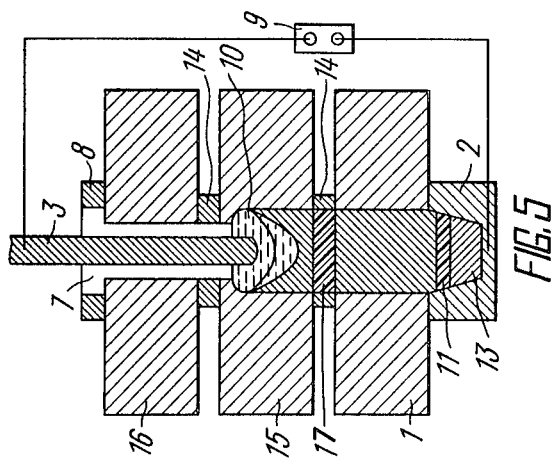

ELECTROSLAG WELDING METHOD

FIELD OF THE INVENTION

The present invention relates to the art of welding and is specifically concerned with a method for electroslag welding of metals by a large-section electrode.

DESCRIPTION OF THE PRIOR ART

There has been proposed a method for electroslag welding of copper blanks (U.S. Pat. No. 3,885,121), comprising the steps of establishing and overheating a slag bath by a nonconsumable electrode, removing the nonconsumable electrode from the overheated slag bath and replacing it by a consumable electrode, fusing the latter electrode by the heat of the slag bath and filling with the molten metal the inlet metal mould and the gap between the edges being weld-joined, and subsequently removing the inlet shrinkhead.

The changeover from the process of establishing and overheating the slag bath by the nonconsumable electrode to the process of welding proper by the consumable electrode, inherent in this method, is a prolonged intermediate step which brings about a considerable loss of the heat accumulated in the slag bath and, as a result, a lack of fusion at the beginning of the weld. Also, overheating the slag bath causes it to boil, which upsets the stability of the process.

This method necessitates the step of cutting and appropriate equipment to remove the inlet shrinkhead from the weld joint.

Known in the art is also a method for electroslag welding by a large-section electrode (Safonnikov A.N. Svarka metallov plastinchatymi elektrodami (Metal welding by plate electrodes). Kiev, "Tekhnika", 1966, pp. 57-58), comprising the steps of establishing a slag bath by a consumable electrode, filling by the molten metal the inlet metal mould and the gap between the edges being weld-joined, and subsequently removing the inlet shrinkhead. In this method, the rate of electrode fusion in establishing the slag bath, fusing the electrode and the edges being weld-joined, and filling by the molten metal the inlet metal mould and the gap between the edges, remains constant on condition that the electrical parameters of the welding process are unchanged.

This method fails, however, to ensure a proper fusion of the edges being weld-joined at the bottom of the weld, which leads to an increased electrical resistance of the welded contact. For a proper fusion of the edges at the bottom of the weld and a low electrical resistance weld to be attained, a long time must be spent for heating the slag bath to the working temperatures; in welding, e.g., aluminium, the time is as long as 3-5 min.

The term "working temperatures" is intended to denote the temperature range at which a stable electroslag process and a sound weld are attained.

Extended inlet metal moulds dictated by this prior art method to bring the slag bath to the working temperatures result in a considerable over-expenditure of the electrode metal.

After a weld joint has been made by the prior art method, the inlet shrinkhead is removed by mechanical, arc, etc. cutting.

SUMMARY OF THE INVENTION

The principal object of the invention is to provide a method for electroslag welding of metals by a large-section electrode, which ensures a higher quality of the weld, improved mechanical properties of the weld joint as a whole, a low electrical resistance of the welded contacts, and simplified removal of an inlet shrinkhead by reducing the duration of heating to working temperatures and by forming a brittle interlayer between the inlet shrinkhead and the weld.

This object is attained by a method of electroslag welding of metals by a large-section electrode, comprising the steps of establishing a slag bath, fusing an electrode and the edges being weld-joined, filling with the metal being fused the inlet metal mould and the gap between the edges, and subsequently removing the inlet shrinkhead. According to the invention, the electrode is in establishing the slag bath and filling the inlet metal mould, fused at a rate lower than the rate of its fusion in filling the gap between the edges being weld-joined at constant electrical parameters of the electroslag welding, and a brittle interlayer between the inlet shrinkhead and the weld is formed in the course of welding, the weld being made so that it has a low electrical resistance.

Such a relation between the electrode fusion rates cuts down the time for heating the slag bath to the working temperatures and steps up the heat input in establishing the slag bath and filling the inlet metal mould with the metal. In addition, the welded contacts so produced offer a low electrical resistance.

A modification of the method of the invention for electroslag welding of metals by a large-section electrode is one in which to establish the slag bath and to fill the inlet metal mould, an electrode metal is selected whose melting point exceeds that of the metal being welded, and to fuse the edges being weld-joined and to fill with metal the gap therebetween. An electrode metal identical to the metal being welded is selected and is alternated with an electrode metal having a lower electrical resistance than does the metal being welded.

Such a selection of the electrode melting points reduces the electrode fusion rate in establishing the slag bath and filling the inlet metal mould with metal. The alternation of metals with different electrical conductivity in the electrode allows obtaining the weld metal with interlayers offering a low electrical resistance.

In accordance with the invention, filling the inlet metal mould with metal and forming a brittle interlayer between the inlet shrinkhead and the weld in the course of welding are accomplished by an electrode whose metal forms brittle intermetallic compounds with the metal being welded; such compounds allow the inlet shrinkhead to be easily separated from the weld without resorting to a cutting equipment.

Also, the disposition of the brittle interlayer between the inlet shrinkhead and the weld in the course of welding is governed by selecting the volume of the electrode for establishing the slag bath and filling the inlet metal mould with metal within 80-95% of the inlet metal mould volume.

Selecting the electrode volume within the above range enables the amount of reinforcement of the weld bottom to be controlled in the course of welding without impairing the weld quality.

The invention also provides in the electroslag welding of metals the formation of brittle interlayers between the welds of a plurality of products disposed above one another and weld-joined in a single pass.

Such a welding technique allows a plurality of products to be welded simultaneously, raises the productive capacity of welding, and cuts down the consumption of welding materials.

The electrode volume needed to fill the gap between the edges being weld-joined is to be selected 10–25% greater than the volume defined by the edges.

Such a selection of the electrode volume enables a weld with a varying configuration to be obtained in the course of welding.

BRIEF DESCRIPTION OF DRAWINGS

FIG. 5 shows the appearance of a plurality of products disposed one above another and weld-joined in a single pass according to the invention; and FIG. 6 illustrates a steady-state electroslag welding process and the formation of a weld with interlayers having a low electrical resistance according to the invention.

DETAILED DESCRIPTION OF THE INVENTION

Figure 1:
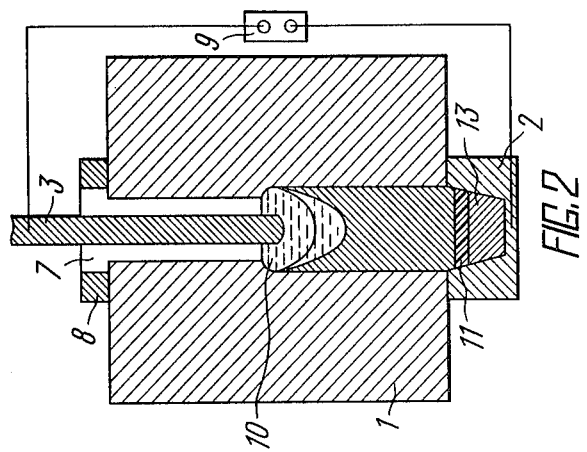
FIG. 1 illustrates the process of establishing a slag bath according to the invention.
Figure 2:
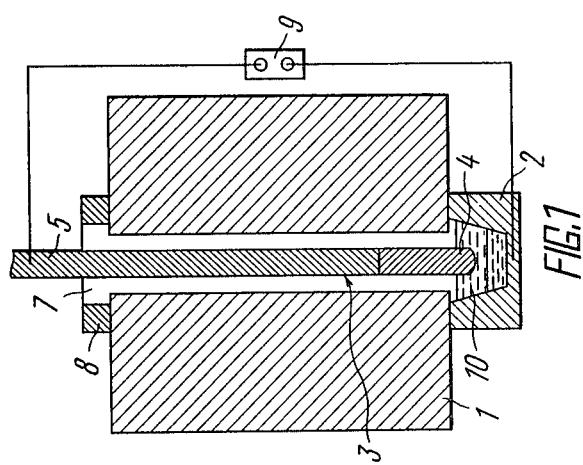
FIG. 2 illustrates a steady-state electroslag welding process according to the invention.
Figure 4:
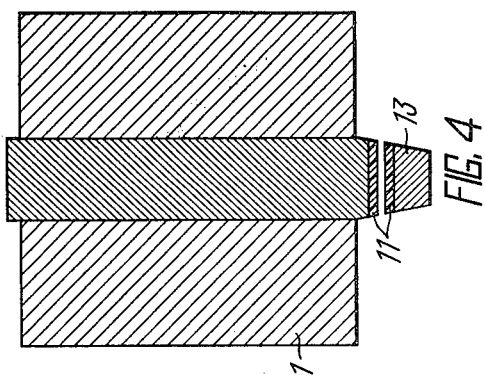
FIG. 4 shows the appearance of the weld joint with the inlet shrink-head removed according to the invention.
Figure 3:
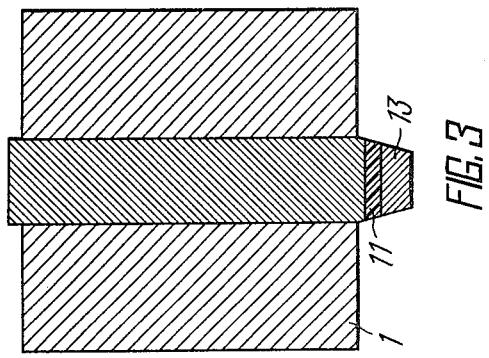
FIG. 3 shows the appearance of a weld joint with a brittle interlayer between the inlet shrinkhead and the weld according to the invention.

The method for electroslag welding of metals by a large-section electrode according to the invention is explained by way of particular examples of accomplishing it.

EXAMPLE 1

70×500-mm section aluminium busbars or segments 1 to be weld-joined were placed with a 50-mm gap on an inlet metal mould 2. A 20×60-mm section electrode 3 was installed into the gap between the busbars 1 so that it contacted the bottom of the metal mould 2. The bottom part 4 of the electrode 3 was copper, its volume being of 80% of the volume of the metal mould 2; the melting point of the metal of the bottom part of the electrode 3 was 1080° C.

The top part 5 of the electrode 3 was aluminium with 20×60×10-mm copper inserts 6 spaced at 100 mm from one another. The melting point of the metal of the top part 5 of the electrode was 660° C., and of the inserts it was 1080° C.

The bottom part 4 and top part 5 of the electrode 3 and the inserts 6 were butt-welded. The volume of the top part 5 of the electrode 3 was 10% greater than the volume defined by the edges to be weld-joined of the busbars 1. Moulding shoes 7 were installed at the sides of the busbars 1 to be weld-joined, and graphite run-on plates 8 were placed atop the busbars 1.

The electrode 3 and busbars 1 were then connected to a welding transformer 9. Flux (not shown) was poured into the metal mould 2, and the welding circuit was closed.

The welding conditions were as follows:
$U_{no-load} = 36$ V;
$I_{weld} = 4.0$ kA.

Melting down, the flux shunted the arc and gave rise to a slag bath; the bottom part of the electrode 3 started fusing. After the bottom part 4 of the electrode 13 fused down, the metal mould 2 was filled by 80% with copper, following which a 10 mm thick brittle interlayer 11 formed, consisting of compounds of the metal of the bottom part 4 of the electrode 3 and of the metal being welded of the busbars 1, i.e. of copper and aluminium. During a further fusion of the electrode 3, namely of the top part 5 thereof, the gap between the edges being-weld-joined was being filled. The weld thus formed had interlayers 12 of aluminium-copper system compounds whose electrical resistance is less than that of the metal being welded, i.e. aluminium.

After the welding gap becomes filled with the electrode metal, the welding current was switched off.

The inlet shrinkhead 13 was easily removed from the weld along the brittle interlayer 11 by exposing the shrinkhead 13 to a small impact load, and then the obtained weld reinforcement was measured, which amounted to 10 mm. The weld was free of shrinkage porosities.

Different fusion rates of the bottom part 4 and the top part 5 of the electrode 3, attained by selected the metal of the electrode 3 so that the melting point of the bottom part 4 was 1080° C., and of the top part 5 was 660° C., shortened the time for heating the slag bath 10 to the working temperature by 25% as against that in the prior art method.

The weld thus produced was equivalent in mechanical properties to the metal being welded.

The electrical resistance of the welded contact was 10% lower than that of the busbars being weld-joined.

Note: In welding assemblies other than welding contacts, the interlayers 12 in the weld are not used.

The following examples of accomplishing the method for electroslag welding in accordance with the invention were similar to Example 1; the welding parameters are listed in the Table below, the welding conditions being the same.

The weld reinforcement was in Example 2, of 3 mm; in Example 3, of 5 mm. In accomplishing the method according to Example 4, there was a large (20 mm) reinforcement at the expense of the electrode material at the weld bottom after the shrinkhead had been removed,

| Example No. | Material of busbars being | Material of electrode bottom part | Material of electrode inserts | Volume of electrode bottom part in % of metal mould volume | Volume of electrode top part in % of volume defined by edges being weld-joined | Melting point of metal of electrode bottom part, °C. |
|---|---|---|---|---|---|---|
| 2 | Magnesium | Cu | — | 95 | 125 | 1080 |
| 3 | Steel C.3 | Ti | — | 90 | 120 | 1700 |
| 4 | Al | Cu | Cu | 75 | 105 | 1080 |
| 5 | Al | Cu | Cu | 100 | 130 | 1080 | which necessitated an additional working.

In accomplishing the method according to Example 5, a decrease in the section of the weld working part was noted at the weld bottom after removing the inlet shrinkhead, which was caused by some weld metal being removed jointly with the shrinkhead.

The time for heating the slag bath to the working temperature was in Examples 2, 4, and 5 the same as in Example 1, and in Example 3 half as long as in the prior art method.

The welds produced in Examples 2 and 3 had a weld joint factor of 0.8 and 0.9 respectively, i.e. the weld strength was respectively 80 and 90% of the strength of the metal being welded.

EXAMPLE 6

This Example is given to explain the accomplishment of the method for electroslag welding in one pass of products disposed one above another.

Three butt joints of 50×100-mm section aluminium busbars were welded simultaneously.

The welding was accomplished similarly to Example 1. An electrode section of 20×40 mm was selected. Busbars 15 and 16 to be weld-joined were placed atop busbars 1 with 50×50×100-mm copper spacers 14 interposed between the busbars (see FIG. 5). The gap between the edges to be weld-joined of the busbars 1, 15, and 16 was selected at 50 mm. The welding resulted in producing an integral weldment which readily separated into three welded busbars 1, 15, and 16 under an impact load applied to brittle interlayers 17 disposed at the places of installation of the spacers 14. The inlet shrinkhead 13 of the busbar 1 easily separated from the busbar along the brittle interlayer 11.

The reinforcement of the first weld was similar to that obtained in Example 1.

INDUSTRIAL APPLICABILITY

The invention may be used in nonferrous metallurgy, electrical, chemical, and machine-building industry in manufacturing large-size weldments whose components are mainly of aluminium, copper, titanium and steel.

The invention may be particularly useful in manufacturing heavy aluminium busbars for electrolyzers used in nonferrous metallurgy.

We claim:

1. A method for electroslag welding of metal segments by a large-section electrode, comprising the steps of establishing a slag bath, fusing an electrode and edges of the metal segments being weld-joined, filling with the metal being fused an inlet metal mould and the gap between the edges of the metal segments, and subsequently removing an inlet shrinkhead, wherein the improvement comprises the electrode being, in establishing the slag bath and filling with metal the inlet metal mould, fused at a rate lower than the electrode fusion rate in filling with metal the gap between the edges of the metal segments being weld-joined at constant electrical parameters of the electroslag welding, and a brittle interlayer between the inlet shrinkhead and the weld being formed in the course of welding, the weld being made so that it has a low electrical resistance.

2. A method as defined in claim 1, further comprising, to establish the slag bath and to fill the inlet metal mould with metal, selecting an electrode whose metal has a melting point exceeding the melting point of the metal being welded, and fusing the edges of the metal segments being weld-joined and filling with metal the gap therebetween, and selecting an electrode metal identical to the metal being welded and alternating it with an electrode metal having a lower electrical resistance than the metal being welded.

3. A method as defined in claim 1, wherein filling the inlet metal mould with metal and forming the brittle interlayer between the inlet shrinkhead and the weld in the course of welding are accomplished by an electrode whose metal forms brittle intermetallic compounds with the metal being welded.

4. A method as defined in claim 1, wherein filling the inlet metal mould with metal and forming the brittle interlayer between the inlet shrinkhead and the weld in the course of welding are accomplished by an electrode whose metal forms brittle intermetallic compounds with the metal being welded, and the disposition of the brittle interlayer between the inlet shrinkhead and the weld in the course of welding is governed by selecting the volume of the electrode for establishing the slag bath and filling the inlet metal mould with metal within 80–95% of the inlet metal mould volume.

5. A method as defined in claim 1, wherein producing a weld of a varying configuration is controlled by selecting the volume of the electrode for filling with metal the gap between the edges being weld-joined 10–25% greater than the volume defined by the edges.

6. A method as defined in claim 1, wherein the brittle interlayers are formed between the welds of products disposed one above another and separated from one another by spacers whose material forms brittle intermetallic compounds with the metal being welded, the welding of a plurality of products being carried out simultaneously in a single pass.

* * * * *